3,153,023
COPOLYMERS OF ETHYLENE AND PROPYLENE

Carl A. Lukach and Harold M. Spurlin, Wilmington, Del., and Setha G. Olson, Moorestown, N.J., assignors to Hercules Powder Company, Wilmington, Del., a corporation of Delaware
No Drawing. Filed Jan. 13, 1961, Ser. No. 82,417
14 Claims. (Cl. 260—88.2)

This invention relates to a process of preparing a homogeneous copolymer of ethylene and a higher 1-olefin, and to the outstandingly superior copolymers so produced.

It is now well known that olefins may be polymerized at relatively low temperatures and pressures by means of the so-called Ziegler catalyst, i.e. a transition metal compound used in combination with a metal alkyl. It is also known that mixtures of olefins may be copolymerized by this process. However, in the preparation of such copolymers, the olefins, having different polymerization rates, one monomer then enters into the copolymerization reaction faster than the other with the result that the copolymer that is produced is not homogeneous. Such a copolymer varies not only as to the composition of the copolymer but as to the molecular weight distribution. Hence, only a small fraction of the total polymer may be one that has useful properties, and more than likely, even that small fraction will not have optimum properties for certain applications. Such is the case when ethylene and propylene are copolymerized by the so-called Ziegler process or modifications thereof. Ethylene enters into the polymer much faster than does propylene and it has previously been impossible to produce an ethylene-propylene copolymer of uniform composition and narrow molecular weight distribution. While it has previously been possible to produce a copoylmer essentially free of homopolymers, the product was still heterogeneous, that is, it was a mixture of copolymers varying widely in their ethylene and propylene contents. Only by tedious fractionation procedures has it been possible to isolate fractions somewhat more homogeneous in character, but even these fractions leave much to be desired. Obviously, such a product and such a process is not desirable for the commercial production of these copolymers, as for example, copolymers for use as a rubber substitute in tires.

Now in accordance with this invention it has been found that ethylene may be copolymerized with a second olefin by a process that yields an outstandingly superior copolymer in both the elastomeric and plastomeric ranges and at the same time by a process wherein the total polymeric product is essentially homogeneous as to its composition and which product has a narrow molecular weight distribution.

In the process of this invention ethylene and a second olefin, as for example, propylene, are copolymerized in a homogeneous liquid phase reaction mixture by passing ethylene and, for example, propylene, into an inert liquid organic solvent having dissolved therein the copolymerization catalyst, at such a rate that the ratio of ethylene to propylene in the reaction mixture is kept constant throughout the polymerization reaction, the inert organic liquid diluent being one that is a solvent for each of the olefin monomers, the catalyst used for the copolymerization, and the copolymer that is produced, wherein the catalyst used for the copolymerization reaction is that formed by mixing a diorganoaluminum halide with a vanadium compound having the formula $VOY_{3-n}X_n$ where Y is an alkoxide group or an acetylacetonate group, X is halogen, and $n$ is 0 to 2 when Y is an alkoxide group and $n$ is 0 when Y is an acetylacetonate group. By carrying out the process int his manner it has been discovered that not only essentially all of the copolymer so produced is homogeneous as to its composition but also it has a narrow molecular weight distribution, and the copolymers so produced and containing from about 25 to about 60 mole percent of propylene have exceptional elastomeric properties which enable their use as a replacement for rubber.

One of the criteria in carrying out the copolymerization process and producing a homogeneous product of uniform composition and narrow molecular weight distribution is the catalyst that is used for the copolymerization reaction. It must be completely soluble in the reaction mixture. It has been found that the catalyst formed by reacting a diorganoaluminum halide with an ester of orthovanadic or halo-orthovanadic acid or a vanadium oxyacetylacetonate is unique in that the copolymer produced in the process of this invention is essentially homogeneous as to its composition, i.e. as to the mole ratio of the monomers in the product. As already stated, the effective catalyst is formed by mixing the aluminum compound and the vanadium compound. This mixing may be done prior to introduction of the catalyst in the polymerization system or the catalyst may be produced in situ by addition of one or both of the catalyst ingredients. Any aluminum compound having the formula $R_2AlX$ where R is a hydrocarbon radical and X is halogen may be used as the aluminum compound in this catalyst system. Thus, the hydrocarbon group may be any alkyl, cycloalkyl, aryl or alkaryl group, as for example, methyl, ethyl, propyl, isopropyl, n-butyl, isobutyl, tert-butyl, amyl, isoamyl, isoprenyl, hexyl, isohexyl, 2-methylpentyl, octyl, 2-ethylhexyl, cyclohexyl, phenyl, benzyl, etc., and the halogen may be chlorine, bromine or iodine. Mixtures of dialkylaluminum halides with other alkylaluminum compounds may be used, as for example, aluminum alkyl sesquihalides, etc., as, for example, ethylaluminum sesquichloride, isobutylaluminum sesquichloride, etc.

The vanadium compound may be any compound having the formula $VOY_{3-n}X_n$ where Y is an alkoxide group or an acetylacetonate group, X is a halogen, and $n$ is a number from 0 to 2 when Y is an alkoxide group and is 0 when Y is an acetylacetonate group. Thus, the vanadium compound may be a trialkyl ester of orthovanadic acid, a dialkyl ester of halo-orthovanadic acid, or an alkyl ester of dihalo-orthovanadic acid, which esters have the general formula $VO(OR)_{3-n}X_n$ where R is alkyl, X is halogen and $n$ is 0 to 2, or the vanadium compound may be a vanadium oxy triacetylacetonate which compounds have the general formula $VOA_3$ where A is the acetylacetonate radical, or a haloacetylacetonate radical or other β-diketone group. Exemplary of such vanadium compounds are triethyl orthovanadate, tri(n-propyl)orthovanadate, tri(n-butyl)orthovanadate, tri(tert-butyl)orthovanadate, diethyl chloro orthovanadate, monoethyl dichloro orthovanadate, vanadium oxy triacetylacetonate, vanadium oxy tri(fluoroacetylacetonate), vanadium oxy tri(hexafluoroacetylacetonate), etc. While mixtures of these vanadium compounds may be used, the presence of other metal contaminants, and particularly compounds of titanium, such as titanium trichloride, are to be avoided because of their inherent tendency to give a high rate of polymerization of ethylene rather than copolymerization of the ethylene with the second olefin.

As already pointed out, the catalyst for the copolymerization reaction may be prepared prior to introduction into the copolymerization reaction mixture by mixing solutions of the two catalyst ingredients, either in the diluent that is used for the copolymerization reaction or in a diluent that is miscible with the copolymerization recation diluent. Preferably the premixed catalyst is used within a relatively short time, this time interval depending upon the temperature and the diluent used in preparing the premixed catalyst and on the vanadium compound used as one of the components of the catalyst. Thus, if ethyl vanadate is used as the vanadium compound, the premixed catalyst is preferably used within a few hours because of loss of activity of the catalyst. On the other hand, n-butyl and isobutyl vanadate catalysts retain their activity for a longer period and may be held for as long as 24 hours and the tert-butyl vanadate catalysts may be held for as long as two weeks, particularly if the diluent used for preparing the catalysts is an aliphatic hydrocarbon such as n-heptane. Catalysts prepared in a diluent such as chlorobenzene tend to have a shorter catalyst life. When these premixed catalysts are used, the catalyst composition is added in increments or continuously throughout the copolymerization reaction. When the catalyst ingredients are reacted in situ, solutions of each of the catalyst ingredients in an inert organic solvent, which again may be the same as the solvent used for the copolymerization reaction or one that is miscible therewith, are separately added either continuously or in increments throughout the polymerization reaction. If a copolymer having both homogeneity as to its composition and also narrow molecular weight distribution is desired, continuous addition of either the premixed catalyst or continuous addition of both catalyst ingredients is preferred. While incremental addition of the catalyst or incremental formation of the catalyst in situ is an approximation of continuous addition, particularly if the interval between increments is relatively short, the molecular weight distribution is broader, and the longer the time interval between increments, the broader the molecular weight distribution of the final product. However, whether continuous or incremental addition of the catalyst is used, the copolymer product still is essentially homogeneous as to its composition. It is also possible to form the catalyst in situ by adding either one of the catalyst components initially and adding the other one continuously or incrementally. Here, again, the molecular weight distribution of the copolymer product will be broader than if both catalyst ingredients were added continuously, but, as before, the copolymer composition will be homogeneous. Regardless of the method by which the catalyst is formed, that is, premixed or formed in situ by one means or another, the amount of catalyst added or formed at any one time must be such that it will remain in solution in the polymerization mixture. In general, the amount of catalyst added is such as will maintain a reasonable rate of copolymerization under the reaction conditions, that is, the type of copolymerization process, monomers being copolymerized, temperature, pressure, etc. It has been found that in the catalyst system used in this invention, the rate of loss of catalytic activity is very high if the catalyst concentration is high in the presence of the olefin monomers. The rate of catalyst decay can be, in fact, proportional to the square of the catalyst concentration. Accordingly, a great advantage in the yield of polymer per unit of catalyst consumed is derived if the catalyst is always added in such a fashion as to maintain a stationary, but low concentration. The particular catalyst concentration at which the process is preferably maintained will depend on the temperature and pressure at which the polymerization is carried out, the monomers being copolymerized, etc. Thus, for example, the higher the temperature, the lower the stationary active catalyst concentration that should be maintained for optimum results. In general, the rate of addition of the catalyst will preferably be at or below about 3 millimoles of vanadium per liter per hour. The ratio of aluminum compound to vanadium compound may be varied considerably but preferably will be such that there is at least one aluminum for every oxygen in the vanadium compound. Thus, for a trialkyl orthovanadate the ratio of dialkylaluminum halide to the vanadium compound will be at least 4:1, and for a dialkyl chloro orthovanadate, will be at least 3:1, and for a vanadium oxy triacetylacetonate it will be at least 7:1, etc. Generally, a slightly higher ratio will be used, and in some cases additional aluminum compound may be added during the copolymerization reaction. Obviously a ratio of aluminum to oxygen less than 1:1 may be used; but, in this case, the vanadium is not completely utilized so that the catalyst requirement increases very rapidly and molecular weight decreases as the aluminum to oxygen ratio becomes less than 1:1. Conversely, there is a slight improvement in the amount of copolymer produced per unit of vanadium as the aluminum to vanadium ratio is increased from the above ratio up to a ratio of about 30:1. It is frequently desirable to add additional aluminum compound initially in order to remove polar impurities in the reaction mixture which may be present in the solvent, etc., as for example, water, oxygen, etc., and in fact, excessively large amounts of the aluminum compound may be added initially for this purpose. It should be realized that any aluminum alkyl that has reacted with impurities such as water is not available as an activator, and that such reaction products, if present, can have undesirable effects which can be minimized by using a swamping concentration of the alkylaluminum halide. However, generally speaking, the higher the excess of aluminum compound over that stated above, the lower the molecular weight of the copolymer produced. Hence, it is generally desirable to maintain the aluminum to vanadium ratio as close to the minimum ratio as possible if a high molecular weight product is desired. On the other hand, if a product of more moderate molecular weight is desired, higher ratios of aluminum to vanadium may be used, as for example, a range of from 15:1 to about 30:1 up to a range of 100:1 or higher.

The copolymerization process of this invention is carried out in an inert liquid organic diluent which is a solvent for the polymerization system. As pointed out above, to obtain a copolymer product of homogeneous composition throughout, the diluent should be one that is a solvent not only for the monomers being copolymerized but also for the copolymer that is produced. In addition, it should also be a solvent for the catalyst so that the entire copolymerization reaction mixture is homogeneous throughout the copolymerization process. Suitable diluents for the copolymerization are, in general, the hydrocarbon solvents, i.e. aromatic, alicyclic and aliphatic hydrocarbons and chlorinated aromatic, alicyclic and aliphatic hydrocarbons and mixtures thereof. Exemplary of such diluents that may be used are hexane, heptane, octane, nonane, decane, benzene, toluene, xylene, cyclohexane, methylcyclohexane, methylene chloride, carbon tetrachloride tetrachloroethylene, chlorobenzene, dichlorobenzene, etc. While any diluent or mixture of such diluents may be used, it is frequently advantageous to use carbon tetrachloride, alone or in admixture with any other diluent, in that the rate of polymerization and/or the mileage of the vanadium catalyst component is increased, when even a small amount of carbon tetrachloride is present in the diluent.

The copolymerization reaction may be carried out over a wide range of temperature and pressure conditions. In general, as the temperature of the reaction increases, the catalyst mileage and the molecular weight of the copolymer decrease. Any temperature within the range of from about 0° C. to about 150° C., preferably from about 0° C. to about 125° C., and more preferably from about 25 to about 80° C., may be used. Copolymers of high molecular weight containing anywhere from 30 to 99 mole percent of propylene may be prepared at the lower temperatures, as for example, 25° C. to 35° C., but to prepare copolymers containing less than about 30 mole percent of propylene it is generally necessary to use increasingly higher temperatures in order to maintain a homogeneous reaction mixture. In general, the reaction will be carried out at or about atmospheric pressure, but may be carried out at anywhere from 1 to 30 atmospheres pressure. Higher pressures, as for example, up to 100 atmospheres or more, can be used if desired.

By carrying out the copolymerization reaction in accordance with this invention it is possible to prepare a copolymer of any desired composition of from 0.5 to 99.5 mole percent of ethylene and 99.5 to 0.5 mole percent of the second olefin. It is likewise possible to prepare copolymers of any desired molecular weight up to an RSV of at least about 12, again depending somewhat upon the composition of the copolymer, the temperature of the reaction, the Al/V ratio, pressure, and the presence of deliberately added ingredients such as hydrogen.

In accordance with this invention any linear 1-olefin may be copolymerized with ethylene to produce a homogeneous copolymer, particularly outstanding results being obtained in the case of ethylene-propylene copolymerization and ethylene-(1-butene) copolymerization.

A further advantage of the process of this invention is that ethylene may be copolymerized with a second olefin to produce a copolymer of any desired composition by saturating the liquid reaction mixture with a given monomer concentration and maintaining the saturation at this level throughout the copolymerization reaction. During the copolymerization the ratio of ethylene to the second olefin in the gas phase is very different from that in the liquid phase since the second olefin is more soluble than ethylene, and ethylene is more reactive than the second olefin, so that the two monomers do not enter the polymer in the ratio of their concentration in the solution. The composition of the copolymer being formed at any one moment is given by the copolymerization equation $$\frac{m_2}{m_3} = \frac{M_2}{M_3}\left(\frac{r_2 M_2 + M_3}{r_3 M_3 + M_2}\right)$$

where $M_2$ and $M_3$ are mole fractions of ethylene and the second olefin, respectively, in the gas phase in equilibrium with the solution, $m_2$ and $m_3$ are mole fractions of ethylene and the second olefin in the copolymer being formed, and $r_2$ and $r_3$ are the reactivity ratios for ethylene and the second olefin, respectively. Using the process in accordance with this invention and the catalyst obtained by mixing a dialkylaluminum halide with an alkyl orthovanadate, for example, it has been found that for ethylene-propylene copolymerizations at or near room temperature, $r_2$ equals approximately 5 and $r_3$ equals approximately 1/5. Using these $r_2$ and $r_3$ values and inserting the mole fraction of ethylene and propylene desired in the copolymer, it is then possible to calculate what monomer composition should be maintained in the gas phase in equilibrium with the solution and so produce the desired copolymer. It should be noted that if $r_2$ and $r_3$ were based on concentrations in solution, and with chlorobenzene as the diluent, the values would be $r_2$ equals 26 and $r_3$ equals 0.04, due to the 5.2-fold greater solubility of propylene in chlorobenzene. For example, to prepare copolymers containing 30 mole percent of propylene, it is necessary to saturate the diluent initially with a mixture of monomers containing 68 mole percent of propylene and then keep the composition of the gas in equilibrium with the liquid constant at 68 mole percent of propylene throughout the copolymerization reaction. This may be readily done by monitoring the composition of the off-gas from the reaction and maintaining the composition at the desired level by adjusting the ratio of the ethylene and propylene in the inlet streams.

It has further been discovered that the copolymers produced in accordance with this invention are unique in their high degree of uniformity and resultingly superior physical properties over those of the prior art copolymers.

Thus it has been found that ethylene-propylene copolymers containing from about 25 to about 60 mole percent propylene and preferably from about 28 to about 43 mole percent propylene and having an RSV of from about 2.0 to about 8 and preferably from about 3 to about 6 and further characterized by having a uniformity of composition such that at least 90% of the total polymer will have a propylene content within 5 percentage units of the average composition, i.e. within the range of from −5 to +5 percentage units of the average composition, are outstanding elastomers possessing, when vulcanized, high tensile strengths, excellent ozone and oxidation resistance, excellent wear resistance, and in which the modulus and elongation can be adjusted by changes in the cure conditions over a wide latitude. These new compolymers are also characterized by having lower heat build-ups than the prior art copolymers. In fact, these copolymers characterized by such homogeneity of composition have physical properties, the majority of which are equal to or better than even natural rubber or the prior art synthetic rubbers such as styrene-butadiene rubber, butyl rubber and neoprene. Because of their excellent properties they may be used as general purpose rubbers for the manufacture of tires, industrial goods, coatings, etc.

Products of lower comonomer content, i.e. lower than about 25 mole percent propylene, for example, are less rubberlike in character and assume some of the characteristics of plastics, both in uncured and cured compositions. It has been found that ethylene-propylene copolymers having a propylene content of from about 10 mole percent to about 20 mole percent and a high degree of uniformity, as when prepared by the process of this invention, are especially advantageous because they combine the desirable features of high extensibility, high strength, and toughness. These properties are particularly useful in wire coatings, upholstery, tubing, film and floor tile. For example, an ethylene-propylene copolymer containing 17.5 mole percent propylene made by this process (Example 13 below), when compounded with 50 parts of carbon black per hundred parts of copolymer and crosslinked with a peroxide-sulfur recipe, gave a vulcanizate with excellent snap and recovery after stretching. Its tensile strength was 4500 p.s.i., elongation almost 400%, and it was useful as a wire coating. Other materials in this range of propylene content have shown cured tensile strengths up to 5500 p.s.i. Materials in this range of propylene content also show the unusual property, in the thermoplastic uncured state, or in the cured state, of maintaining a high percentage of their elongation upon stretching at room temperature, and of recovering almost completely to their original length when subsequently warmed, whereas materials in the elastomeric range, for example 25–60% propylene, recover almost completely after stretching. Copolymers below about 10% propylene are more highly crystalline and tend to neck-down on stretching in the same manner as linear polyethylene. This characteristic behavior on stretching of copolymers in the range of about 10% to about 20% propylene makes them useful as electrical tapes for cable manufacture, since they can be wound and heat-shrunk, thereby giving a tight air-free coating which is necessary for high voltage uses. Since the shrinking temperature is below 100° C., such copolymer in film form is useful for packaging of poultry and other items.

The following examples will illustrate the process of copolymerizing ethylene with a second olefin in accordance with this invention. All parts and percentages are by weight unless otherwise indicated. The molecular weight of the copolymer is indicated by the citation of the reduced specific viscosity (RSV) of the copolymer as measured in Decalin at 135° C. By the term "Reduced Specific Viscosity" is meant the $\eta_{sp}/c$ determined on an 0.1% solution of the polymer in Decalin, containing 0.1 g. of the polymer per 100 ml. of solution, at 135° C.

EXAMPLES 1 AND 2

In these examples a series of ethylene-propylene copolymerizations was conducted in a one-liter flow reactor with the catalyst formed in situ. The apparatus was alternately evacuated and flushed with nitrogen three times, 500 milliliters of the diluent, chlorobenzene, was added under nitrogen, and the apparatus was again alternately evacuated and flushed with nitrogen three more times. The temperature of the reactor was adjusted to the desired value. Streams of ethylene and propylene were metered through a calibrated rotameter, mixed, and introduced into the reactor below the liquid level. The diluent was saturated at the rate of 1 liter/min. with a mixture of the ethylene and propylene in the proper ratio to yield a copolymer of the desired composition. The saturation composition for any desired copolymer composition was calculated as described above. An additional rotameter was used to record the volume of the off-gas. When the inlet and off-gas rotameter readings were identical, indicating that saturation was complete, the volume of the input mixture was reduced to 250 ml./min., and the off-gas was passed through a thermal conductivity cell so that its composition could be monitored and kept constant throughout the copolymerization run. In some instances at this point, there was added to the saturated diluent, by syringe, diethylaluminum chloride in order to remove any impurities, such as water, from the diluent so that the copolymerization would begin immediately upon addition of the catalyst. The two catalyst ingredients, diethylaluminum chloride and triethyl orthovanadate, were added as 0.1 M and 0.02 M solutions in n-heptane, respectively. These solutions were pumped into the mixture separately and continuously with individual microbellows pumps at the rate of 0.5 ml./min. As soon as the copolymerization reaction started, there was an immediate drop in the value of the off-gas rotameter reading. At this point both the volume and the composition of the input gas mixture were adjusted so that the off-gas volume remained at 250 ml./min. and the off-gas composition remained at the saturation composition. Thus, the volume of the total input mixture was increased or decreased as the off-gas volume decreased or increased respectively. In the same way, if the off-gas composition increased in, for example, ethylene, then less ethylene was used in the input gas mixture until the galvanometer reading returned to its original value. Generally speaking, adjustments were only required during about the first 15 minutes of the reaction, a steady state having been reached by that time, and only very slight further manipulation of the controls was required to maintain the off-gas composition constant. The copolymerizations were run until the homogeneous reaction mixture became very viscous, and it was difficult to control the off-gas composition because of the change in the rate of solution of ethylene in the viscous mixture.

In the copolymerization reaction of Example 1a the saturation composition of the ethylene and propylene in the reaction mixture and the off-gas composition were maintained at 71 mole percent of propylene and 29 mole percent of ethylene; in Examples 1b and 1c these compositions were maintained at 80 mole percent of propylene and 20 mole percent of ethylene; and in Example 1d these compositions were maintained at 86 mole percent of propylene and 14 mole percent of ethylene. In Example 2 the effect of temperature and pressure on the copolymerization reaction is demonstrated, the copolymerization of Example 2a being carried out at 0–3° C. and 1 atmosphere of pressure and Examples 2b and c being carried out at 60° C. with Example 2b at 1 atmosphere of pressure and Example 2c at 2 atmospheres of pressure.

The copolymerization reaction mixture which was homogeneous in each case was quenched by adding 10 milliliters of n-butanol and then was diluted with 100–200 milliliters of heptane. The reaction mixture was then washed with 200 milliliters of 10% aqueous hydrochloric acid, the organic layer was separated and successively washed with water until the aqueous phase was neutral. The copolymer which was completely soluble in each case was then isolated by pouring the organic layer into 3 times its volume of acetone. The rubbery mass so obtained was separated from the acetone, cut into small pieces and dried for 16 hours under vacuum at 40° C.

In Table I is set forth the temperature and pressure at which each of these copolymerization reactions was carried out along with the saturation composition and off-gas composition expressed as mole percent of propylene ($C_3$) and the amount of each of the catalyst ingredients. The copolymer produced in each of these examples was essentially 100% soluble in the reaction mixture.

Also given in Table I is the amount of this soluble copolymer produced, expressed as grams per liter per hour, the reduced specific viscosity (RSV) as determined on a 0.1% solution is Decalin at 135° C. and the composition of the copolymer expressed as mole percent of propylene, as determined by infrared analysis, the remainder of the polymer being ethylene.

*Table I*

| Example | Off-Gas, Mole Percent $C_3$ | Temp., °C. | Pressure, Atm. | $Al(C_2H_5)_2Cl$, mMole/liter | | mMole/l. $VO(OC_2H_5)_3$ Added | Al/V Ratio (final) | Reaction Time, Min. | Copolymer Product | | |
|---|---|---|---|---|---|---|---|---|---|---|---|
| | | | | Added Initially | Added by Pump | | | | G./l./hr. | RSV | Mole Percent $C_3$ |
| 1a | 71 | 30 | 1 | 1.5 | 6.3 | 0.89 | 8.5 | 45 | 36 | 3.1 | 33 |
| b | 80 | 28 | 1 | 0.7 | 6.5 | 1.3 | 5.5 | 65 | 25 | 3.4 | 44 |
| c | 80 | 29 | 1 | 0.5 | 7.3 | 1.5 | 4.9 | 60 | 23 | 5.2 | 41 |
| d | 86 | 28 | 1 | 0.92 | 7.4 | 1.5 | 5.6 | 77 | 24 | 3.1 | 54 |
| 2a | 68 | 0–3 | 1 | 0.9 | 1.0 | 0.22 | 12.8 | 50 | 23 | 4.3 | 32 |
| b | 72 | 60 | 1 | 0.41 | 16.5 | 2.75 | 6.16 | 68 | 61 | 2.6 | 28.5 |
| c | 72 | 60 | 2 | 0 | 16.2 | 2.70 | 6.0 | 68 | 94 | 3.7 | 31 |

EXAMPLE 3

A series of ethylene-propylene copolymerizations was carried out by the procedure described above in Example 1 at 30° C. and atmospheric pressure but using various diluents as the polymerization medium. In each of these copolymerizations the catalyst was formed in situ by adding solutions of diethylaluminum chloride and tri-n-butyl orthovanadate. The data for each of these copolymerizations are tabulated in Table II along with the description of the soluble copolymer produced in each case. In each case the copolymer was completely soluble and the reaction mixture was entirely homogeneous.

*Table II*

| Example | Off-Gas, Mole Percent $C_3$ | Diluent | $Al(C_2H_5)_2Cl$, mMole/liter | | mMole/l. $VO(O-nC_4H_9)_3$ Added | Al/V Ratio (final) | Reaction Time, Min. | Copolymer Product | | |
|---|---|---|---|---|---|---|---|---|---|---|
| | | | Added Initially | Added by Pump | | | | G./l./hr. | RSV | Mole Percent $C_3$ |
| 3a | 71 | Chlorobenzene | 1.0 | 1.9 | 0.31 | 9.2 | 43 | 50 | 2.8 | 37 |
| b | 71 | Benzene | 0.7 | 2.5 | 0.40 | 8.0 | 37 | 35 | 3.6 | 34 |
| c | 68 | Toluene | 1.25 | 3.6 | 0.59 | 8.3 | 26 | 30 | 2.7 | 26 |
| d | 71 | Heptane | 1.0 | 10.8 | 1.9 | 6.3 | 40 | 35 | 3.8 | 35 |
| e | 68 | Methyl Cyclohexane | 0.75 | 2.9 | 0.47 | 7.9 | 24 | 34 | 4.5 | 30 |

EXAMPLES 4–11

A series of ethylene-propylene copolymerizations was conducted as described in Example 1, varying the dialkylaluminum halide and vanadium compound added to produce the catalyst formed in situ. In each of these copolymerizations chlorobenzene was used as the diluent, except in Example 11 where heptane was used, and the copolymerization was carried out at 30–31° C. and atmospheric pressure. The data for each of these examples are set forth in Table III below along with the description of the soluble copolymer produced in each case. In none of these examples was there any insoluble product produced and the reaction mixture was homogeneous throughout the reaction. The copolymer in each case was purified and isolated as described in Example 1 except for Example 7 where instead of precipitating the polymer by pouring the solution into acetone, the solvents were removed from the solution, leaving the copolymer.

added at whatever rate was necessary to maintain the off-gas volume at 250 ml./min. Thus, the second stream was added at a rate that corresponded to the rate of the reaction throughout the run, and in this way the composition of the off-gas remained constant and insured the preparation of a copolymer of uniform composition. In this example there was added initially to the polymerization reaction mixture in order to remove impurities 1.0 mm./l. of diethylaluminum chloride. A small amount of triethyl orthovanadate (0.2 mmole/l.) was also added initially so as not to disrupt the Al/V ratio of 5.0. The continuous addition of catalyst was begun and 9 minutes elapsed before the reaction started. The reaction mixture was completely homogeneous throughout the copolymerization reaction.

In Examples 13–16 the same procedure was used except that the polymerizations were carried out at higher temperatures using saturation compositions and off-gas com-

*Table III*

| Example | Off-Gas, Mole Percent $C_3$ | $AlR_2Cl$, mMole/l. | | | Vanadium Compound | mMole/l. Added | Al/V Ratio (final) | Reaction Time, Min. | Copolymer Product | | |
|---|---|---|---|---|---|---|---|---|---|---|---|
| | | R= | Added Initially | Added by Pump | | | | | G./l./hr. | RSV | Mole Percent $C_3$ |
| 4 | 71 | Ethyl | 1.5 | 6.3 | $VO(OC_2H_5)_3$ | 0.89 | 8.5 | 45 | 36 | 3.1 | 33 |
| 5 | 71 | ...do... | 1.0 | 1.9 | $VO(O-n-C_4H_9)_3$ | 0.31 | 9.2 | 43 | 50 | 2.8 | 37 |
| 6 | 68 | ...do... | 1.4 | 3.2 | $VO(O-iso\,C_4H_9)_3$ | 0.60 | 5.5 | 30 | 54 | 3.3 | 31 |
| 7 | 68 | ...do... | 0.8 | 4.2 | $VO(O-tert\,C_4H_9)_3$ | 0.75 | 5.5 | 38 | 79 | 2.7 | 33 |
| 8 | 68 | ...do... | 1.3 | 2.5 | $VO(OC_2H_5)_2Cl$ | 0.55 | 6.9 | 31 | 90 | 2.3 | 36 |
| 9 | 68 | ...do... | 1.3 | 1.8 | $VO(OC_2H_5)Cl_2$ | 0.44 | 7.0 | 40 | 74 | 2.5 | 39 |
| 10 | 68 | Methyl | 1.0 | 3.5 | $VO(OC_2H_5)_3$ | 0.76 | 6.0 | 42 | 53 | 4.1 | 34 |
| 11 | 71 | Aluminum ethyl sesquichloride | 2.0 | 8.9 | $VO(O-n-C_4H_9)_3$ | 2.2 | 4.7 | 46 | 47 | 3.0 | 37 |

EXAMPLES 12–16

Ethylene and propylene were copolymerized essentially as described in Example 1 at atmospheric presure using chlorobenzene as the diluent, except that a different means of maintaining the constant composition of the off-gas was used. In these examples there were two input streams containing a mixture of the two monomers in the desired composition to saturate the diluent and maintain the desired saturation composition.

In Example 12, carried out at 30° C., after the diluent was saturated with a mixture of the monomers containing 68 mole percent propylene, one of the input streams containing 68 mole percent propylene was fed into the polymerization reaction mixture at the rate of 250 ml./min. throughout the copolymerization reaction. The catalysts were added and when the reaction began, the second monomer stream containing 30 mole percent propylene was positions of lower propylene content and the composition of the second input monomer stream had to be adjusted to maintain the off-gas composition constant. In each case, the reaction mixture was homogeneous throughout the run.

The copolymers were purified as described in Example 1 except that all operations were carried out at the same temperature as was used for the polymerization. The copolymers were isolated by removing the diluent from the copolymer solution by evaporation. In Table IV is set forth the off-gas composition maintained during the polymerization in each case, the temperature at which the polymerization was run, the amounts of diethylaluminum chloride and triethyl vanadate added in each case, along with the yield of copolymer, its RSV and composition expressed as mole percent of propylene as determined by infrared analysis.

Table IV

| Example | Off-Gas, Mole Percent $C_3$ | Temp., °C. | Al($C_2H_5$)$_2$Cl, mMole/l. | | VO(O$C_2H_5$)$_3$, mMole/l. | | Al/V Ratio (final) | Reaction Time, Min. | Copolymer Product | | |
|---|---|---|---|---|---|---|---|---|---|---|---|
| | | | Added Initially | Added by Pump | Added Initially | Added by Pump | | | G./l./hr. | RSV | Mole Percent $C_3$ |
| 12 | 68 | 30 | 1.0 | 5.23 | 0.2 | 1.04 | 5.0 | 49 | 46 | 3.7 | 29 |
| 13 | 47 | 75 | 0 | 5.6 | 0 | 1.1 | 5.0 | 40 | 37 | 4.3 | 17.5 |
| 14 | 36 | 76 | 0 | 5.12 | 0 | 0.97 | 5.3 | 35 | 59 | 3.3 | 12.5 |
| 15 | 23 | 82 | 0 | 2.4 | 0 | 0.48 | 5.0 | 23 | 62 | 3.9 | 7 |
| 16 | 4 | 106–8 | 0 | 7.04 | 0 | 1.41 | 5.0 | 38 | 19 | 5.6 | *1–3 |

*Approximate due to inaccuracy of infrared analysis at such a low propylene content.

EXAMPLES 17–20

In these examples ethylene and propylene were copolymerized using a modified Parr-Reactor, which is a low pressure hydrogenation instrument. The reactor was equipped with a pressure regulator and a gage between the storage tank, i.e. feed tank, and the glass reaction bottle.

In each case, the reactor was charged with 200 ml. of chlorobenzene as the diluent which was then saturated with the specified monomer mole ratio indicated as mole percent propylene ($C_3$). Diethylaluminum chloride was then added in one portion, except for Examples 18 and 20 where continuous addition was used. In each of these examples an excessively large amount of aluminum alkyl was added to remove impurities that were thought to be present and the copolymers produced had resultingly lower RSV's. The copolymerizations were carried out at 25.0 p.s.i.g. total constant pressure by feeding the reactor the mixture of monomers indicated in Table V so as to maintain a constant saturation composition. The vanadium compound was added in the form of a toluene solution in the case of the tri(2-ethylhexyl orthovanadate used in Example 17 and as a benzene solution in the case of the vanadium oxy triacetylacetonate, the vanadium oxy tris(trifluoroacetylacetonate), and the vanadium oxy tris(hexafluoroacetylacetonate) used in Examples 18, 19 and 20, respectively. These solutions were added slowly throughout the reaction. The copolymerization reactions were stopped by adding 5 ml. of n-butanol. The reaction mixtures were 100% homogeneous in each case. The copolymer solutions were washed with three successive portions of aqueous sodium hydroxide, then with water until neutral, filtered, concentrated in a rotary evaporator until syrupy and then dried.

In Table V are set forth the saturation composition, i.e. the ethylene and propylene ratio in the saturated reaction solution, and monomer feed composition, both expressed as mole percent of propylene ($C_3$), the polymerization temperature, the amount of each of the catalyst components, the reaction time, yield of polymer and RSV and propylene content (mole percent $C_3$) as determined by infrared analysis.

catalyst ingredients were premixed and the premixed catalyst was added in increments throughout the polymerization instead of forming the catalyst in situ as described in Examples 1 and 2.

The premixed catalysts were prepared by mixing solutions of the two catalyst ingredients, namely, diethylaluminum chloride and the vanadium compound, in a vessel which had previously been alternately evacuated and flushed with nitrogen. The diluent used as the solvent for the preparation of these premixed catalysts was chlorobenzene in the case of Examples 22, 24 and 27 and heptane in the others. The solutions of the two catalyst ingredients were mixed at room temperature and increments of this premixed catalyst were added to the polymerization reactor periodically throughout the polymerization upon demand of the copolymerization when it became obvious by an increase in volume of off-gas that the rate of reaction was subsiding and more catalyst was needed. These premixed catalysts were used immediately after preparation, except in the case of Example 23 where the catalyst was aged for 3 hours at room temperature and Example 26 where it was aged for 6 days prior to use. In some instances a small amount of diethylaluminum chloride was added to the polymerization system prior to addition of the premixed catalyst to remove any impurities such as moisture, etc., 2.0 mmole/l. being added in Examples 23, 24 and 26 and 1 mmole/l. in Examples 22, 28 and 29. An additional amount of diethylaluminum chloride was also added in some cases as activator for the catalyst in increments during the polymerization.

Each of these polymerization reactions was carried out using chlorobenzene as the diluent and the polymerization was carried out at 29–31° C. and atmospheric pressure. As before, the diluent was saturated with a mixture of ethylene and propylene in the proper ratio to yield the desired copolymer composition, and this saturation composition was maintained at that level by maintaining the composition of the off-gas at that saturation composition throughout the polymerization. As before, the polymerizations were carried out until the homogeneous re- Table V

| Example | Mole Percent $C_3$ | | Temp., °C. | Al ($C_2H_5$)$_2$Cl, mMole/l. | Vanadium Compound | mMole/l. | Reaction Time, Min. | Copolymer Product | | |
|---|---|---|---|---|---|---|---|---|---|---|
| | Saturation | Feed | | | | | | Yield, G./l./hr. | RSV | Mole Percent $C_3$ |
| 17 | 70 | 30 | 30 | 5 | Tri(2-ethylhexyl) orthovanadate. | 0.13 | 20 | 41 | 1.3 | 34.5 |
| 18 | 70 | 30 | 36 | 8 | Vanadium oxy triacetylacetonate. | 0.05 | 8 | 58 | 2.4 | 38 |
| 19 | 60 | 30 | 55 | 7.65 | Vanadium oxy tris(trifluoroacetylacetonate). | 0.225 | 25 | 79 | 0.67 | 31 |
| 20 | 70 | 30 | 30 | 15.3 | Vanadium oxy tris(hexafluoroacetylacetonate). | 0.018 | 85 | 18 | 1.5 | 36.5 |

EXAMPLES 21–29

In these examples a series of ethylene and propylene copolymerizations was conducted in a one-liter flow reactor by the same general procedure described above in Examples 1 and 2, except that in these examples the two action mixture became very viscous and it was difficult to control the off-gas composition because of the change in the rate of solution of ethylene in the viscous mixture. The copolymerization reaction mixture which was completely homogeneous in each case was then quenched by adding 10 ml. of n-butanol and the copolymer was isolated as described in Examples 1 and 2 except in the case of Example 27 where instead of precipitating the polymer in acetone, the diluents were distilled off and the copolymer then dried.

In Table VI are set forth the off-gas composition, expressed as mole percent of propylene ($C_3$) at which each of these examples was maintained during the polymerization, the amount of each of the catalyst ingredients used in the preparation of the premixed catalyst, the number of increments of this premixed catalyst solution that was added, the additional diethylaluminum chloride added during the polymerization, if any, and the final ratio of aluminum to vanadium used in each case. Also given is the yield of copolymer produced expressed as grams per liter per hour, the reduced specific viscosity as determined on a 0.1% solution in Decalin at 135° C. and the composition of the copolymer so produced expressed as mole percent of propylene as determined by infrared analysis, the remainder of the polymer being ethylene.

Al/V raito of 6.5. The copolymerization reaction mixtures were completely homogeneous. In Example 31 there was obtained 32.4 g./l./hr. of copolymer having an RSV of 2.1 and $C_3$ content of 28 mole percent and in Example 32 a yield of 55.2 g./l./hr. of copolymer with an RSV of 2.8 and $C_3$ content of 27 mole percent was obtained.

In Example 33, ethylene and propylene were copolymerized by essentially the same procedure as described for Example 1 except that it was carried out on a proportionally larger scale in a 30 gal. reactor using 65 liters of chlorobenzene and carrying out the reaction at 60° C. and 5 p.s.i.g. pressure. A saturation composition of 65 mole percent propylene was maintained and the diethylaluminum chloride and triethyl orthovanadate were each added to the reaction mixture at a ratio of 4.56. The soluble copolymer so produced had an RSV of 3.7 and contained 28 mole percent of propylene.

Three gram samples of each of these copolymers, all of

Table VI

| Example | Off-Gas, Mole Percent $C_3$ | Pre-mixed Catalyst Components | | | No. of Catalyst Increments Added | Additional AlEt$_2$Cl Added, mMole/l. | Al/V Ratio (final) | Reaction Time, Min. | Copolymer Product | | |
|---|---|---|---|---|---|---|---|---|---|---|---|
| | | AlEt$_2$Cl, mMole/l. | Vanadium Compound | mMole/l. | | | | | G./l./hr. | RSV | Mole Percent $C_3$ |
| 21 | 70 | 6.7 | VO(OC$_2$H$_5$)$_3$ | 1.3 | 6 | 0 | 5.0 | 40 | 39 | 2.9 | 33.5 |
| 22 | 71 | 0.8 | VO(OC$_2$H$_5$)$_3$ | 0.8 | 0 | 3.9 | 5.9 | 36 | 42 | 3.3 | 29 |
| 23 | 84 | 4.8 | VO(OC$_2$H$_5$)$_3$ | 1.2 | 21 | 2.4 | 6.0 | 50 | 16 | 3.7 | 48 |
| 24 | 84 | 5.9 | VO(OC$_2$H$_5$)$_3$ | 1.2 | 15 | 1.0 | 7.5 | 119 | 15 | | 49 |
| 25 | 73 | 4.8 | VO(O-n-C$_4$H$_9$)$_3$ | 0.96 | 8 | 2.5 | 7.6 | 52 | 37 | 3.3 | 29 |
| 26 | 84 | 2.3 | VO(O-n-C$_4$H$_9$)$_3$ | 0.58 | 3 | 4.0 | 10.9 | 45 | 21 | 3.2 | 51 |
| 27 | 68 | 13.2 | VO(O-tert-C$_4$H$_9$)$_3$ | 2.6 | 6 | 0 | 5.0 | 38 | 29 | 4.9 | 30 |
| 28 | 71 | 10.0 | VO(OC$_2$H$_5$)$_2$Cl | 2.0 | 8 | 1.0 | 5.8 | 42 | 28 | 5.3 | 39 |
| 29 | 68 | 5.5 | VO(OC$_2$H$_5$)Cl$_2$ | 1.1 | 5 | 1.0 | 6.0 | 30 | 30 | 4.5 | 31 |

EXAMPLE 30

Ethylene and 1-butene were copolymerized using the general procedure described in Example 12 with chlorobenzene as the diluent. The saturation and off-gas composition used was 33 mole percent of 1-butene. After the chlorobenzene was saturated, one input monomer stream containing 33 mole percent 1-butene was added at the rate of 250 ml./min. throughout the copolymerization. The continuous addition of both the diethylaluminum chloride and triethyl orthovanadate was begun and when the reaction started (2 min.), the second input monomer stream containing 26–30 mole percent 1-butene was added at whatever rate was necessary to keep the total off-gas volume at 250 ml./min. and adjusted as needed to keep the off-gas composition at 33 mole percent 1-butene. The total reaction time was 37 min. The amount of diethylaluminum chloride added was 3.3 mmole/l. and of triethyl orthovanadate was 0.65 mmole/l. The total Al/V ratio was 5.0. The reaction mixture was entirely homogeneous and the copolymer was purified and isolated as before. The yield of ethylene-(1-butene) copolymer was 65.5 g./l./hr. It had an RSV of 1.9 and contained about 30 mole percent of 1-butene.

EXAMPLES 31–33

These examples demonstrate the homogeneous composition of copolymers produced in accordance with this invention.

In Examples 31 and 32 ethylene and propylene were copolymerized by the same procedure used in Example 12 except that different Al/V ratios were used. In Example 31 there was added initially 0.8 mmole/l. of diethylaluminum chloride and 0.16 mmole/l. of triethyl orthovanadate and by pump during the reaction (total time 27 min.) 3.0 mmole/l. of the aluminum compound and 0.54 mmole/l. of the vanadium compound, a total Al/V ratio of 5.4. In Example 32 there was added initially only the aluminum compound (0.06 mmole/l.) and during the polymerization (total time 45 min.) there was added by pump 4.74 mmole/l. of diethylaluminum chloride and 0.74 mmole/l. of triethyl orthovanadate, a total which were completely soluble in chlorobenzene, were successively extracted with 300 ml. each of ether, n-hexane and n-heptane at reflux temperature for periods of 68–120 hours. These excessive reflux periods were used to assure complete extraction by each solvent. At the end of each extraction period, the liquid was decanted and the residue was washed twice with additional hot solvent. The combined liquid filtrates were then evaporated and the residues obtained were weighed and analyzed for propylene ($C_3$) content expressed as mole percent as determined by infrared analysis. In Table VII are set forth for each example the percent of the total copolymer extracted by each solvent and the $C_3$ content of that fraction. In each case no residue remained after the n-heptane extraction.

Table VII

| Example | Original Chlorobenzene Soluble Copolymer | | Ether Extract | | n-Hexane Extract | | n-Heptane Extract | |
|---|---|---|---|---|---|---|---|---|
| | Percent | Mole percent $C_3$ | Percent | Mole percent $C_3$ | Percent | Mole percent $C_3$ | Percent | Mole percent $C_3$ |
| 31 | 100 | 30 | 53.5 | 30 | 46.2 | 30 | 0.3 | |
| 32 | 100 | 32.5 | 38.5 | 33 | 61.5 | 32 | 0 | |
| 33 | 100 | 28 | 45.9 | 29 | 48.7 | 26.5 | 5.4 | 24.5 |

EXAMPLE 34

Another advantage in carrying out the polymerization in accordance with this invention is demonstrated by this example where aliquots of the reaction mixture were taken at intervals during the run, and the copolymer isolated from each aliquot and analyzed for RSV and mole percent propylene. The copolymerization was carried out as in Example 33 in a 30 gal. reactor using 65 liters of chlorobenzene. In this case the polymerization was run at 30° C., 5 p.s.i.g. and with the saturation composition at 75 mole percent propylene. The diethylaluminum chloride and triethyl orthovanadate were added by pump during the run at an Al/V ratio of 4.56. The total reaction time was 2 hours and the reaction mixture was completely homogeneous throughout the run. Tabulated below are the times, cited as minutes from the start of the reaction, at which the aliquots were taken and the RSV and propylene ($C_3$) content of each.

| Min | 15 | 30 | 75 | 120 |
|---|---|---|---|---|
| RSV | 3.7 | 3.9 | 3.5 | 3.7 |
| Mole Percent $C_3$ | 38 | 36 | 39 | 40 |

Thus, it may be seen that not only is the copolymer product produced in accordance with this invention, outstandingly homogeneous as to its composition, but also it has a narrow molecular weight distribution and a product of essentially the same RSV is produced throughout the run.

EXAMPLES 35–38

To demonstrate the outstandingly superior elastomeric copolymer of ethylene and propylene that may be produced by the process of this invention, the properties of the vulcanizates of products produced in several of the foregoing typical examples are given here.

The copolymers of Examples 1c, 2a, 2c, and 10 were vulcanized using the following formulation:

|  | Parts |
|---|---|
| Copolymer rubber | 100 |
| High abrasion furnace black | 50 |
| Dicumyl peroxide | 4 |
| Sulfur | 2 |
| Quinone dioxime | 2 |
| Red lead | 10 |

Each formulation was cured for 40 min. at 310° F. The physical properties of these vulcanizates identified as Examples 35–38, respectively, are set forth in Table VIII.

Table VIII

| Example | 35 | 36 | 37 | 38 |
|---|---|---|---|---|
| RSV | 5.2 | 4.3 | 3.7 | 4.1 |
| Mole Percent Propylene | 41 | 32 | 31 | 34 |
| Tensile Strength, p.s.i. | 3,445 | 3,495 | 4,030 | 3,940 |
| Modulus: |  |  |  |  |
| (100%), p.s.i. | 330 | 490 | 322 | 382 |
| (200%), p.s.i. | 950 | 1,180 | 717 | 1,070 |
| (300%), p.s.i. | 1,770 | 2,140 | 1,730 | 1,970 |
| (400%), p.s.i. | 2,900 | 3,295 | 2,830 | 3,010 |
| Maximum Elongation, Percent | 455 | 430 | 500 | 480 |
| Break Set, Percent (10 min.) | 10 | 10 | 20 | 20 |
| Hardness, Shore | 61 | 68 | 60 | 65 |
| Heat Build-up, $\Delta T°$ F., 212° F | | | 39 | 33 |

EXAMPLE 39

An ethylene-propylene copolymer having an RSV of 3.9 and containing 27 mole percent propylene, prepared as described in Examples 33 and 34, using a temperature of 30° C., 5 p.s.i.g. pressure, and a saturation composition of 64 mole percent propylene was vulcanized with a carbon black, sulfur, dicumyl peroxide formulation. In a standard test designed to evaluate the tread wear in a tire, this copolymer rubber was shown to be better than the control made of a standard butadiene-styrene copolymer rubber.

EXAMPLE 40

Ethylene and propylene were copolymerized in a ½-gallon reactor equipped with a hollow shaft stirrer using 1600 ml. of a commercial heptane, which was chiefly a mixture of paraffin and naphthenic hydrocarbons and had a boiling range of 94–99° C., as the diluent. The saturation gas contained 68 mole percent propylene and 32 mole percent ethylene. The reaction was carried out at 30° C. with the pressure maintained at 30 p.s.i.g. by feeding on demand a gas mixture containing 30 mole percent of propylene. There was added to the reaction mixture initially 0.625 millimole of aluminum ethyl sesquichloride and additional sesquichloride was fed continuously (total of 4.54 millimoles per liter). The tert-butyl vanadate was fed continuously (total of 0.134 millimole per liter). This was a final Al/V ratio of 33.8. The reaction was run for 56 minutes, and there was produced 41.2 g./l./hr. or 286 g./millimole of V of copolymer. It had an RSV of 5.7 and contained 31 mole percent of propylene and was completely amorphous.

EXAMPLES 41–43

Ethylene and propylene were copolymerized in a one-liter flow reactor with the catalyst formed in situ following the general procedure described in Example 1. The diluent used in Examples 41 and 42 was carbon tetrachloride and in Example 43 was chlorobenzene to which had been added 1.41 volume percent of carbon tetrachloride. In Examples 41 and 43 both catalyst components were added continuously, and in Example 42 all of the vanadium compound was added initially. In Examples 41 and 42 the saturation gas contained 68 mole percent propylene and the feed gas, 30 mole percent propylene, and in Example 43 these gases contained 60 mole percent and 23 mole percent propylene, respectively.

In Table IX is set forth the amount of aluminum compound and vanadium compound used in each of these examples expressed as millimoles per liter, the ratio of aluminum to vanadium, the reaction time, the amount of copolymer produced expressed as grams per liter per hour and as grams per millimole of vanadium and the RSV of the copolymer and the mole percent of propylene therein.

Table IX

| Example | Diluent | Al($C_2H_5$)$_2$Cl, mMole/l. | | VO(O$C_2H_5$)$_3$, mMole/l. | Al/V Ratio | Reaction Time, Min. | Copolymer Product | | | |
|---|---|---|---|---|---|---|---|---|---|---|
| | | Initially | Total | | | | G./l./hr. | G./mMole | RSV | Mole Percent $C_3$ |
| 41 | CCl$_4$ | 0.23 | 4.28 | 0.86 | 5.0 | 46 | 48.3 | 46.4 | 1.6 | 36.8 |
| 42 | CCl$_4$ | 0.43 | 1.72 | 0.20 | 8.6 | 97.5 | 26.5 | 216 | 2.5 | 28 |
| 43 | $C_6H_5$Cl+1.41 vol. percent CCl$_4$ | | 2.08 | 0.42 | 5.0 | 27 | 51.2 | 55.3 | 2.8 | 24.5 |

EXAMPLE 44

Ethylene and propylene were copolymerized in a continuous run carried out in a 125-gallon reactor at 87 p.s.i.g. Commercial heptane (see Example 40) containing the feed monomer in solution was fed at the rate of 15 gallons per hour. Separate streams of tri-tert-butyl orthovanadate and ethylaluminum sesquichloride dissolved in the same solvent were fed to the reactor at the rate of 0.06 mole of the tert-butyl vanadate and 0.64 mole of ethylaluminum sesquichloride per hour. This was an Al/V ratio of 10. The monomer content of the liquid phase was continuously monitored, keeping the ethylene content between 8 and 10% of the total ethylene plus propylene. The temperature was maintained at 60–63° C. After a steady state had been reached, the product was obtained at the rate of 150 lbs. per day. The copolymer so produced had an RSV of 3.5 and it contained 33 mole percent of propylene. It was completely soluble in heptane at room temperature.

This copolymer was vulcanized using the following recipe and curing for 45 minutes at 310° F.:

100 parts of copolymer
    50 parts of high abrasion furnace black
    4 parts of dicumyl peroxide
    0.8 part of sulfur The vulcanizate so obtained had a tensile strength of 3170 p.s.i., a modulus (300%) of 2780, maximum elongation of 310%, Shore hardness (A2) of 74, break set of 30% and resilience of 42%.

This application is a continuation-in-part of our application Serial No. 796,261, filed March 2, 1959, now abandoned.

What we claim and desire to protect by Letters Patent is:

1. The process of copolymerizing ethylene with a linear 1-olefin which comprises passing ethylene and said olefin into an inert organic liquid solvent therefor and for the copolymer produced, at a temperature of from about 0° C. to about 150° C., in the presence of at least a catalytic amount of a catalyst dissolved in said solvent and providing and maintaining said amount of catalyst throughout the copolymerization reaction varying the ratio of ethylene to said 1-olefin fed to the reaction to maintain the ratio of ethylene to said olefin dissolved in the solvent constant throughout the copolymerization reaction and recovering as the total product of copolymerization a copolymer which is essentially homogeneous as to its composition and has a narrow molecular weight distribution, said catalyst being the catalyst formed on mixing an aluminum compound having the formula $R_2AlX$ where R is a hydrocarbon radical and X is halogen, with a vanadium compound having the formula $VOY_{3-n}X_n$ where Y is selected from the group consisting of an alkoxide group and an acetylacetonate group, X is halogen and $n$ is 0 to 2 when Y is an alkoxide group and is 0 when Y is an acetylacetonate, at least one of said catalyst components being added continually throughout the copolymerization reaction.

2. The process of claim 1 wherein the linear 1-olefin copolymerized with the ethylene is propylene.

3. The process of claim 1 wherein the linear 1-olefin copolymerized with the ethylene is 1-butene.

4. The process of claim 2 wherein the aluminum compound is a dialkylaluminum halide.

5. The process of claim 2 wherein the aluminum compound is an alkylaluminum sesquihalide.

6. The process of claim 4 wherein the vanadium compound is a trialkyl orthovanadate.

7. The process of claim 4 wherein the vanadium compound is a dialkyl chloro orthovanadate.

8. The process of claim 4 wherein the vanadium compound is a monoalkyl dichloro orthovanadate.

9. The process of claim 5 wherein the vanadium compound is a trialkyl orthovanadate.

10. The process of claim 6 wherein the catalyst is formed by mixing a dialkylaluminum chloride with the trialkyl orthovanadate in a mole ratio of at least about 4:1 in an inert hydrocarbon and adding the catalyst mixture to the copolymerization reaction mixture in increments throughout the reaction.

11. The process of claim 6 wherein the catalyst is formed by mixing a dialkylaluminum chloride with the trialkyl orthovanadate in a mole ration of at least about 4:1 in an inert hydrocarbon and adding the catalyst mixture to the copolymerization reaction mixture continuously throughout the reaction.

12. The process of claim 6 wherein the catalyst is formed in situ continuously throughout the copolymerization reaction.

13. The process of claim 6 wherein at least part of the inert organic liquid solvent is carbon tetrachloride.

14. The process of claim 5 wherein the catalyst is formed by mixing tert-butyl vanadate with the alkylaluminum sesquichloride in an Al to V mole ratio of at least about 10:1 in an inert hydrocarbon and adding the catalyst mixture to the copolymerization reaction mixture continually throughout the reaction.

References Cited by the Examiner

UNITED STATES PATENTS 2,962,451   11/60   Schreyer  ------------  260—94.9

FOREIGN PATENTS 538,782   12/55   Belgium.
553,655    6/57   Belgium.

OTHER REFERENCES

Billmeyer: Textbook of Polymer Chemistry (1957), Interscience Publishers Inc., New York, page 239.

J. L. SCHOFER, *Primary Examiner.*

L. H. GASTON, W. H. SHORT, *Examiners.*

UNITED STATES PATENT OFFICE
CERTIFICATE OF CORRECTION

Patent No. 3,153,023

October 13, 1964

Carl A. Lukach et al.

It is hereby certified that error appears in the above numbered patent requiring correction and that the said Letters Patent should read as corrected below.

Column 2, line 1, for "int his" read -- in this --; line 71, for "recation" read -- reaction --; column 11, line 35, for "-ethylhexyl" read -- -ethylhexyl) --; columns 15 and 16, Table IX, in the heading to the ninth column, after "G./mMole" insert -- V. --; column 18, line 23, for "ration" read -- ratio --; line 33, for "alykyl-" read -- alkyl- --.

Signed and sealed this 16th day of March 1965.

(SEAL)
Attest:

ERNEST W. SWIDER
Attesting Officer

EDWARD J. BRENNER
Commissioner of Patents